(12) United States Patent
Ilic et al.

(10) Patent No.: US 10,831,824 B1
(45) Date of Patent: Nov. 10, 2020

(54) AUDIO SEGMENT BASED AND/OR COMPILATION BASED SOCIAL NETWORKING PLATFORM

(71) Applicant: Koye Corp., Wilmington, DE (US)

(72) Inventors: Bosko Ilic, Belgrade (RS); Vanja Jovicevic, Belgrade (RS); Nemanja Zbiljic, Belgrade (RS); Stefan Brajkovic, Belgrade (RS)

(73) Assignee: Koye Corp., Wilmington, DE (US)

( * ) Notice: Subject to any disclaimer, the term of this patent is extended or adjusted under 35 U.S.C. 154(b) by 0 days.

(21) Appl. No.: 16/458,899

(22) Filed: Jul. 1, 2019

(51) Int. Cl.
  *G06F 16/638* (2019.01)
  *G06F 16/687* (2019.01)
  *G10L 15/08* (2006.01)
  *H04L 12/58* (2006.01)

(52) U.S. Cl.
  CPC ......... *G06F 16/638* (2019.01); *G06F 16/687* (2019.01); *G10L 15/08* (2013.01); *H04L 51/10* (2013.01); *G10L 2015/088* (2013.01)

(58) Field of Classification Search
  CPC ..... G06F 16/638; G06F 16/687; H04L 51/10; G10L 15/08; G10L 2015/088
  See application file for complete search history.

(56) References Cited

U.S. PATENT DOCUMENTS

| 6,185,527 B1* | 2/2001 | Petkovic | G06F 16/685 704/231 |
| 10,148,910 B2* | 12/2018 | Mercredi | G06K 9/00744 |
| 2010/0142715 A1* | 6/2010 | Goldstein | G11B 20/10527 381/56 |
| 2015/0269835 A1* | 9/2015 | Benoit | H04M 19/04 340/539.13 |
| 2016/0294894 A1* | 10/2016 | Miller | G06F 16/24578 |
| 2017/0110151 A1* | 4/2017 | Matias | G11B 27/031 |
| 2017/0199934 A1* | 7/2017 | Nongpiur | G10L 25/51 |
| 2020/0125316 A1* | 4/2020 | Gruebele | G06F 3/04817 |

* cited by examiner

*Primary Examiner* — Stella L. Woo
(74) *Attorney, Agent, or Firm* — The Watson IP Group, PLC; Jovan N. Jovanovic

(57) ABSTRACT

A device includes a transceiver, a storage device, and a processor. The transceiver receives an audio segment from a remote device, receives a request to communicate the audio segment to another remote device, and communicates the audio segment to the another remote device in response to the request to communicate the audio segment to the another remote device, the audio segment including at least one audio feature extracted from audio recorded by the device. The storage device stores the audio segment. The processor retrieves the audio segment from the storage device in response to the request to communicate the audio segment to the another remote device.

19 Claims, 20 Drawing Sheets

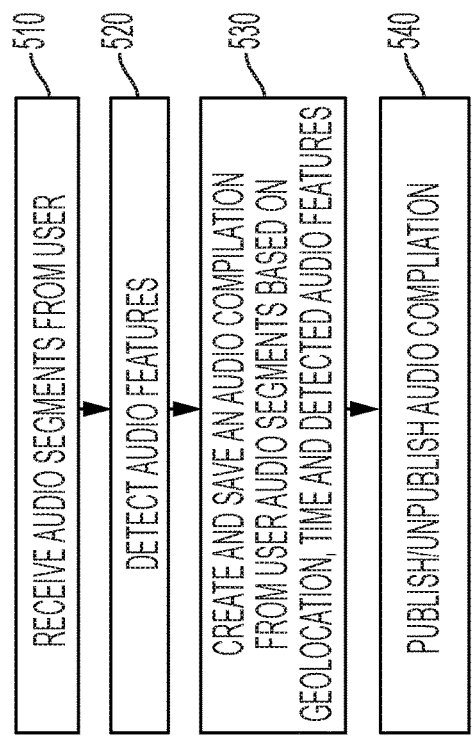
FIG. 5
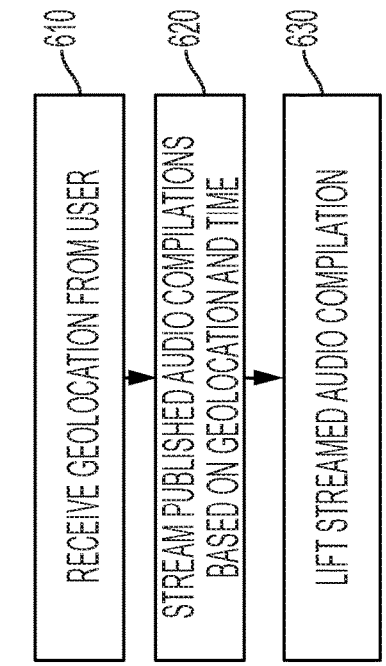
FIG. 7
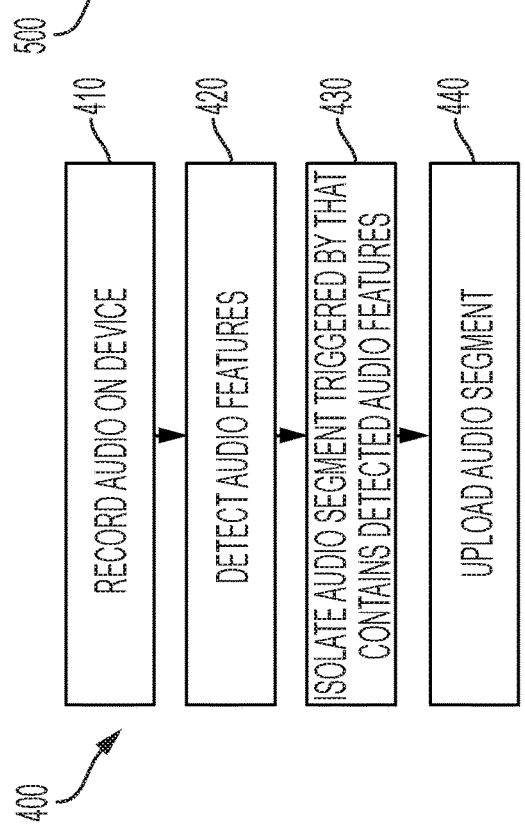
FIG. 4
FIG. 6

FIG. 14

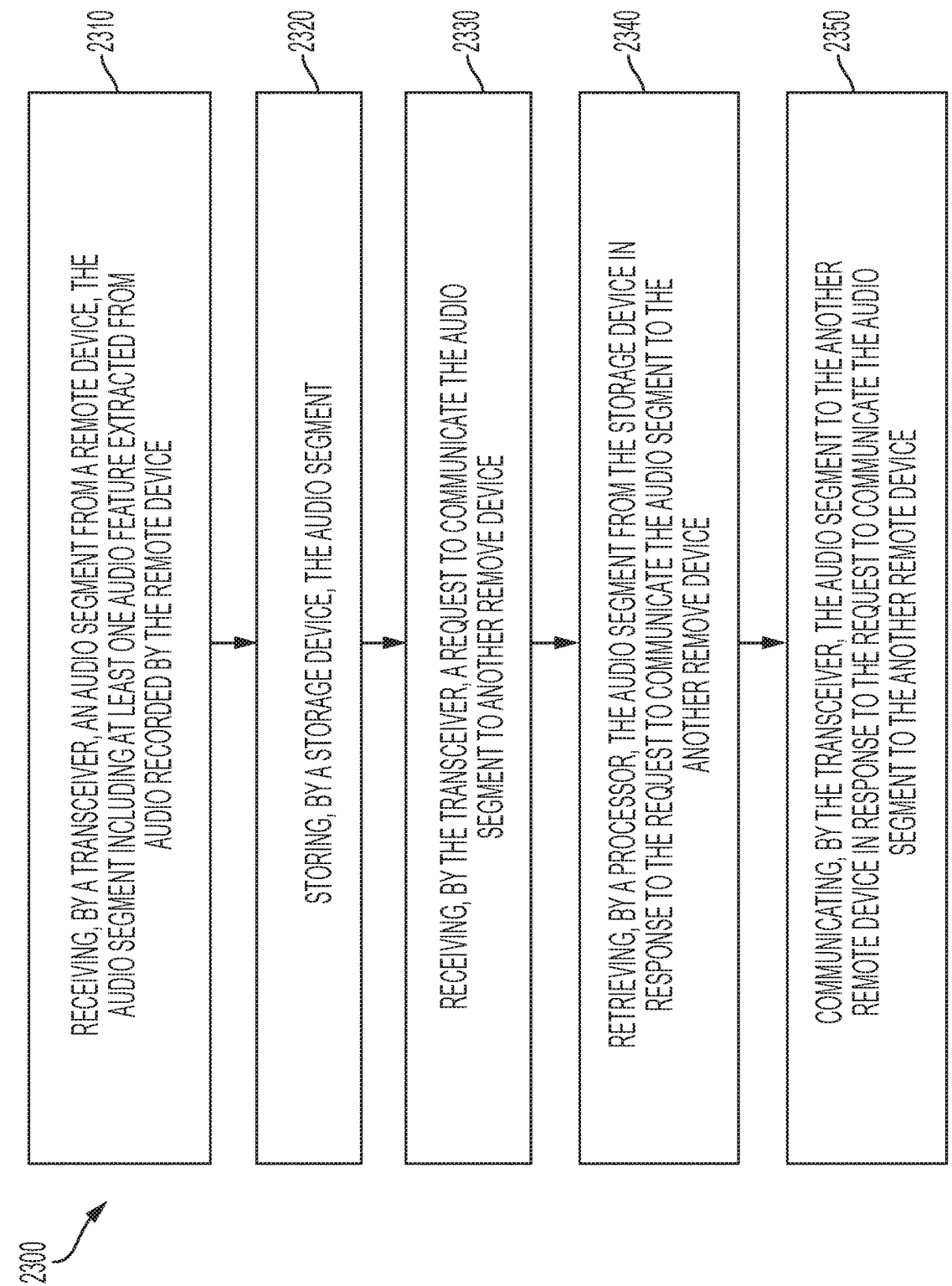

AUDIO SEGMENT BASED AND/OR COMPILATION BASED SOCIAL NETWORKING PLATFORM

CROSS-REFERENCE TO RELATED APPLICATION

NA

BACKGROUND OF THE DISCLOSURE

1. Field of the Disclosure

The disclosure relates in general to a social networking platform, and more particularly, to an audio segment and/or compilation based social networking platform.

2. Background Art

An overload of photo editing and staging of photos exists for social media platforms, such as the leading Instagram platform. Automated beautifying photo apps dominate the app stores, such as the Apple app store. Even the staging of user photos became common as users leveled up their expectations due to being present on photo sharing networks. A good case study is the rise of Instagram pop ups, which are simply unusual backgrounds for the users. Users are limited to reinvent their visual content. However, acts such as going to one of the pop ups, waiting in line, and paying a premium just to have a delicate background, show that at the same time users are desperate for a reinvention. Users are torturing themselves, dedicating a lot of time and energy to keep up a high level by farming for a wanted number of likes. Fatigue is also evident for traditional social media users, because staging, editing, and the acknowledging options within these platforms are taking a toll on the user with regards to factors such as time required to keep up with continuous updates.

Furthermore, as limited capability devices such as smart speaker devices have appeared, traditional social networks have had trouble adapting. For example, visual segments could not translate over to the smart speaker devices. Not only could visual content not be consumed, but visual content could not be created. Thus, such limited capability devices have for the most part been excluded from social media platforms.

SUMMARY OF THE DISCLOSURE

The disclosure is directed to a method that comprises receiving, by a transceiver, an audio segment from a remote device, the audio segment including at least one audio feature extracted from audio recorded by the remote device and storing, by a storage device, the audio segment. The method further includes receiving, by the transceiver, a request to communicate the audio segment to another remove device and retrieving, by a processor, the audio segment from the storage device in response to the request to communicate the audio segment to the another remove device. The method yet further includes communicating, by the transceiver, the audio segment to the another remote device in response to the request to communicate the audio segment to the another remote device.

In some configurations, the audio segment is one of a plurality of audio segments, the method further comprising formulating an audio compilation including the plurality of audio segments and receiving, by the transceiver, a request to communicate the audio compilation to the another remove device. The method even further comprises communicating, by the transceiver, the audio compilation to the another remote device.

In some configurations, a server computer formulates the audio compilation.

In some configurations, the remote device formulates the audio compilation.

In some configurations, the at least one audio feature is extracted from the audio recorded by the remote device based on at least one of word recognition and sound recognition, the audio segment including audio surrounding at least one of a recognized word and a recognized sound.

In some configurations, the audio segment includes associated geolocation information indicating where the remote device was located when recording the audio segment, the method further comprising receiving location information associated with the another remote device and retrieving the audio segment based on the location information associated with the audio segment and the location information associated with the another remote device.

In some configurations, the audio segment is one of a plurality of audio segments, the method further comprising filtering the plurality of audio segments based on a time of creation of the plurality of audio segments and communicating the filtered plurality of the audio segments to the another remote device.

In some configurations, the communicating of the method comprises at least one of streaming the audio segment to the another remote device and uploading the audio segment to the another remote device.

In some configurations, the remote device and the another remote device are at least one of a smart phone, a smart speaker, a portable gaming device, a tablet computer, a personal computer, and a smartwatch.

In some configurations, a server computer implements the method.

In some configurations, the method further comprises receiving geographic information from the remote device and the another remote device, and establishing at least one of a call and connection between the remote device and the another remote device based on the received geographic information.

The disclosure is also directed to a device that comprises a transceiver, a storage device, and a processor. The transceiver receives an audio segment from a remote device, receives a request to communicate the audio segment to another remote device, and communicates the audio segment to the another remote device in response to the request to communicate the audio segment to the another remote device, the audio segment including at least one audio feature extracted from audio recorded by the device. The storage device stores the audio segment. The processor retrieves the audio segment from the storage device in response to the request to communicate the audio segment to the another remote device.

In some configurations, the audio segment is one of a plurality of audio segments, wherein the processor further to formulate an audio compilation including the plurality of audio segments and communicate the audio compilation to the another remote device and the transceiver further to receive a request to communicate the audio compilation to another remove device.

In some configurations, a server computer formulates the audio compilation.

In some configurations, the device formulates the audio compilation.

In some configurations, the processor further to extract at least one audio feature from the audio recorded by the device based on at least one of word recognition and sound recognition, the audio segment including audio surrounding at least one of a recognized word and a recognized sound.

In some configurations, the audio segment includes associated geolocation information indicating where the remote device was located when recording the audio segment, the transceiver further to receive location information associated with the another remote device and the processor further to retrieve the audio segment based on the location information associated with the audio segment and the location information associated with the another remote device.

In some configurations, the audio segment is one of a plurality of audio segments, the processor further to filter the plurality of audio segments based on a time of creation of the plurality of audio segments and the transceiver further to communicate the filtered plurality of the audio segments to the another remote device.

In some configurations, the transceiver at least one of streams the audio segment to the another remote device and uploads the audio segment to the another remote device.

In some configurations, the remote device and the another remote device are at least one of a smart phone, a smart speaker, a portable gaming device, a tablet computer, a personal computer, and a smartwatch.

In some configurations, the device is a server computer.

In some configurations, the transceiver further receives geographic information from the remote device and the another remote device, and establishes at least one of a call and connection between the remote device and the another remote device based on the received geographic information.

BRIEF DESCRIPTION OF THE DRAWINGS

The disclosure will now be described with reference to the drawings wherein:

FIG. 4 illustrates an example flowchart for a method of creating and uploading an audio segment, in accordance with at least one embodiment disclosed herein; and FIG. 5 illustrates an example flowchart of a method of creating and publishing an audio compilation for a particular user, in accordance with at least one embodiment disclosed herein;

FIG. 6 illustrates an example flowchart for a method of using geolocation information and/or time, in accordance with at least one embodiment disclosed herein;

FIG. 7 illustrates an example flowchart of a method of setting up a call between users based on geolocation information, in accordance with at least one embodiment disclosed herein; and FIGS. 8-22 illustrate examples of various graphic user interfaces (GUIs) of the social networking platform shown in FIG. 1, in accordance with at least one embodiment disclosed herein.

FIG. 23 illustrates a flowchart of an example method of communicating an audio segment, in accordance with at least one embodiment disclosed herein.

DETAILED DESCRIPTION OF THE DISCLOSURE

Figure 1:
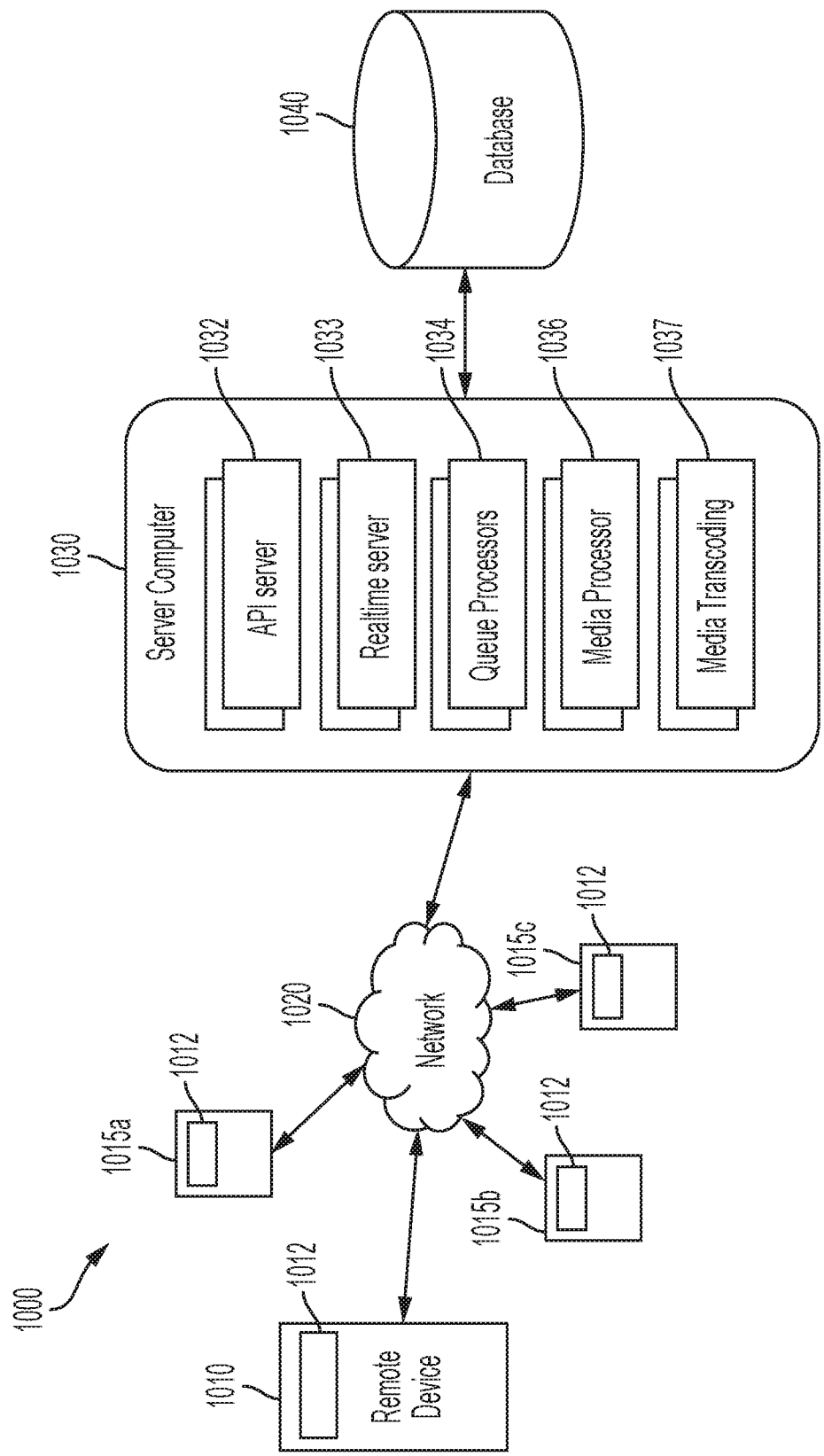
FIG. 1 illustrates an example social networking system, in accordance with the embodiments disclosed herein.

While this disclosure is susceptible of embodiment(s) in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIG. 1, a social networking system 1000 is illustrated that includes a plurality of devices, such as a remote device 1010, one or more other remote devices 1015a, 1015b, 1015c, a communication network 1020, a server computer 1030, and a database 1040. The server computer 1030 includes such modules as an API server module 1032, a real-time server module 1033, a queue processors module 1034, media processor module 1036, and a media transcoding module 1037. The remote device 1010 and the server computer 1030 communicate with each other via the communication network 1020. The server computer 1030 is in communication with the database 1040. The remote device 1010 and/or the other remote devices 1015 can be any of a smart phone, a smart speaker, a portable gaming device, a tablet computer, a personal computer, a smartwatch, or any other computing device that is capable of recording audio, creating audio segments from that recorded audio, and sharing (e.g., uploading) those audio segments to the server computer 1030 and/or playing published audio segments and/or audio compilations. The server computer 1030, such as via the media processor 1036, creates theses audio compilations from two or more audio segments. In at least one embodiment, once the audio compilations are created they cannot be edited. In at least one embodiment, the published audio compilations are uploaded and/or streamed from the server computer 1030. The server computer 1030 thereafter communicates, e.g., uploads and/or streams, those audio segments to one or more other remote devices 1015a, 1015b, 1015c, as disclosed herein.

The social networking system 1000 addresses a need within the art for a social networking platform 1012, such as an "app", that functions with anonymity so that a personal interface is the only way to unlock an identity of a user, but can be shared when the user wants to be judged for popularity. The remote device 1010 executes such an app performing such functionality. The remote device 1010 executes the social networking platform 1012 disclosed herein without requiring editing of content by a user on the remote device 1010. Even further, the remote device 1010 executes the social networking platform 1012 disclosed herein without staging, that is the social networking platform 1012 decides what content is communicated with other remote devices 1015a, 1015b, 1015c.

The remote device 1010 executes the social networking platform 1012 disclosed herein that captures audio, by implementing background recording, and creates audio segments from that background recording that get communicated to one or more of the other remote devices 1015a, 1015b, 1015c for others users to hear. For example, the server computer 1030 receives these audio segments and creates audio compilations and/or shorter audio segments (e.g., removes silent periods from the received audio segments) which are made available to a user that created the audio segments to hear and, in at least one embodiment, made available for others to hear. In at least one other embodiment, the remote device 1010 creates these audio segments and/or the audio compilations. While the social networking platform 1012 is recording, an algorithm extracts audio features from the recorded audio and if a criteria is met, the social networking platform 1012 will isolate, store, and upload audio segments based on the algorithm. The remote device 1010 records and chooses these recorded audio segments, via the social networking platform 1012, automatically once the social networking platform 1012 is executed, without requiring a user to pay attention to their remote device 1010 that is typically near at all times. The social networking platform 1012 also includes socializing functionality, as well as messaging functionality, e.g., data exchange functionality such as text messaging, pictures, other audio, and/or any other data exchange, together with the audio form disclosed herein. The social networking platform 1012 also requests audio segments and/or audio compilations for streaming to the one or more of the other remote devices 1015a, 1015b, 1015c. Thus, the social networking platform 1012 can send created audio segments and/or audio compilations to the server computer 1030 and request audio segments and/or audio compilations from the server computer 1030, dependent upon whether the user is recording and uploading audio segments or desires to listen to audio segments and/or audio compilations, respectively. Further functionality of the remote device 1010 and the one or more of the other remote devices 1015a, 1015b, 1015c is disclosed below with reference to FIGS. 2-23.

Figure 2:
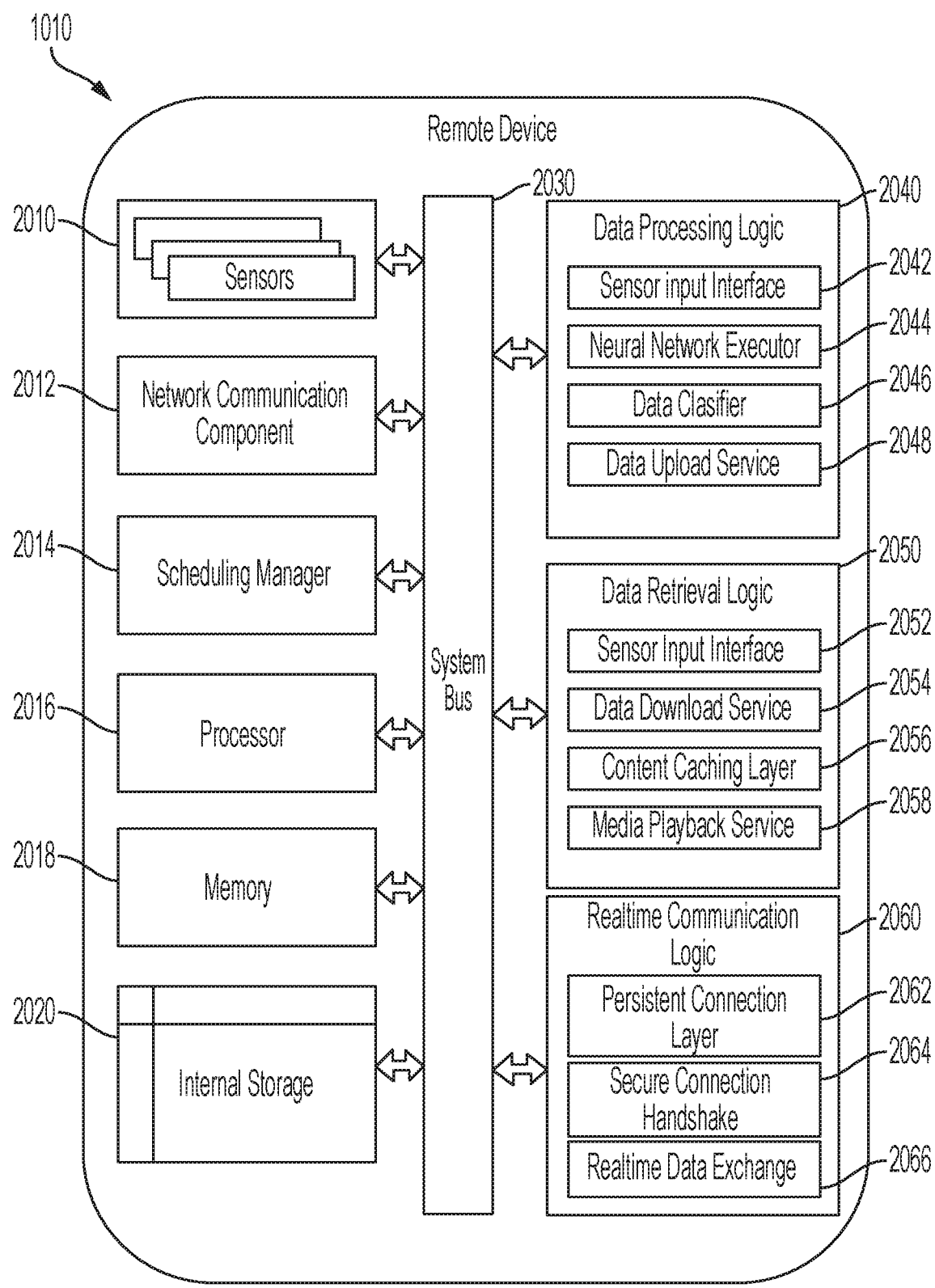
FIG. 2 illustrates an example remote device including components to execute a social networking platform shown in FIG. 1, in accordance with at least one embodiment disclosed herein.

With reference to FIG. 2, a remote device 1010 is illustrated as including components to execute the social networking platform 1012 shown in FIG. 1. In particular, the remote device 1010 is illustrated as including one or more sensor modules 2010, such as an audio sensor, a network communication component module 2012, a scheduling manager module 2014, and a processor module 2016. The remote device 1010 further includes a memory module 2018, an internal storage module 2020, a data processing logic module 2040, a data retrieval logic module 2050, and a real-time communication logic module 2060. The data processing logic module 2040 includes a sensor input interface module 2042, a neural network executor module 2044, a data classifier module 2046, and a data upload service module 2048. The data retrieval logic 2050 includes a sensor input interface module 2052, a data download service module 2054, a content caching layer module 2056, and a media playback service module 2058. All of these modules of the remote device 1010 communicate with each other via a system bus 2030. The modules of the remote device 1010 can be implemented in hardware, software, and/or a combination thereof. The real-time communication logic module 2060 includes a persistent connection layer module 2062, a secure connection handshake module 2064, and a real-time data exchange module 2066.

Figure 3:
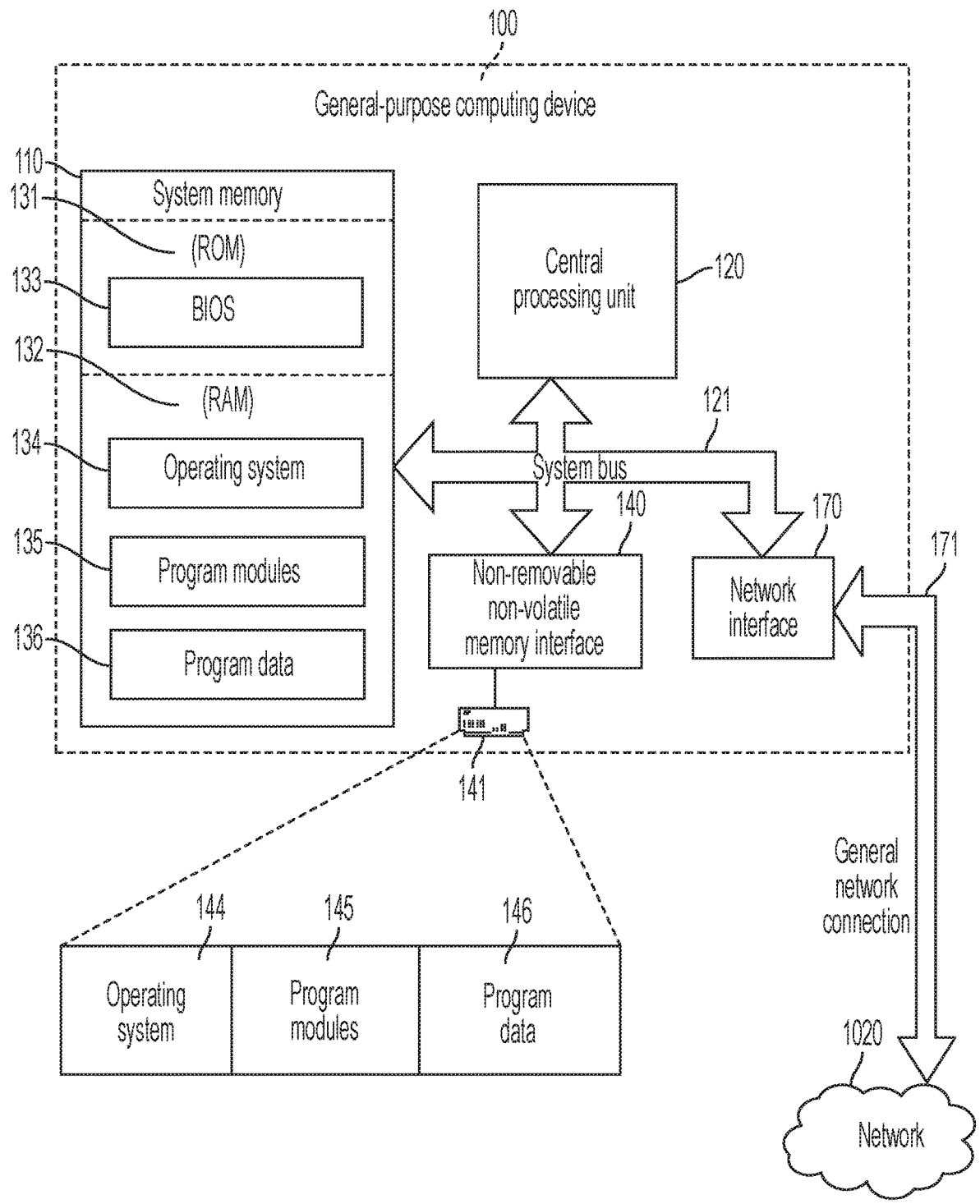
FIG. 3 illustrates an exemplary general-purpose computing device, in accordance with at least one embodiment disclosed herein.

With reference to FIG. 3, an exemplary general-purpose computing device is illustrated in the form of an exemplary general-purpose computing device 100. The general-purpose computing device 100 may be of the type utilized for the remote device 1010 (FIGS. 1 and 2), the other remote devices 1015a, 1015b, 1015c (FIG. 1), the server computer 1030 (FIG. 1), as well as the other computing devices with which the social networking system 1000 may communicate through outside communication network 1020 (FIG. 1). As such, it will be described with the understanding that variations can be made thereto. The exemplary general-purpose computing device 100 can include, but is not limited to, one or more central processing units (CPUs) 120, a system memory 110 and a system bus 121 that couples various system components including the system memory 110 to the CPU 120. The system bus 121 may be any of several types of bus structures including a memory bus or memory controller, a peripheral bus, and a local bus using any of a variety of bus architectures. Depending on the specific physical implementation, one or more of the CPUs 120, the system memory 110 and other components of the general-purpose computing device 100 can be physically co-located, such as on a single chip. In such a case, some or all of the system bus 121 can be nothing more than communicational pathways within a single chip structure and its illustration in FIG. 3 can be nothing more than notational convenience for the purpose of illustration.

The general-purpose computing device 100 also typically includes computer readable media, which can include any available media that can be accessed by computing device 100. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the general-purpose computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

When using communication media, the general-purpose computing device 100 may operate in a networked environment via logical connections to one or more remote computers. The logical connection depicted in FIG. 3 is a general network connection 171 to the communication network 1020, which can be a local area network (LAN), a wide area network (WAN) such as the Internet, or other networks. The computing device 100 is connected to the general network connection 171 through a transceiver, such as a network interface or adapter 170 that is, in turn, connected to the system bus 121. In a networked environment, program modules depicted relative to the general-purpose computing device 100, or portions or peripherals thereof, may be stored in the memory of one or more other computing devices that are communicatively coupled to the general-purpose computing device 100 through the general network connection 171. It will be appreciated that the network connections shown are exemplary and other means of establishing a communications link between computing devices may be used.

The general-purpose computing device 100 may also include other removable/non-removable, volatile/nonvolatile computer storage media. By way of example only, FIG. 3 illustrates a hard disk drive 141 that reads from or writes to non-removable, nonvolatile media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface, such as a non-removeable, non-volatile memory interface 140.

The drives and their associated computer storage media discussed above and illustrated in FIG. 3, provide storage of computer readable instructions, data structures, program modules and other data for the general-purpose computing device 100. In FIG. 3, for example, hard disk drive 141 is illustrated as storing operating system 144, other program modules 145, and program data 146. Note that these components can either be the same as or different from operating system 134, other program modules 135 and program data 136. Operating system 144, other program modules 145 and program data 146 are given different numbers here to illustrate that, at a minimum, they are different copies.

With reference to FIG. 1, again, the foregoing description applies to the social networking system 1000, as well as to any other computing devices in communication with the social networking system 1000 through outside communication network 1020. The CPU 120 is coupled to the network interface 170. The network interface 170 facilitates outside communication in the form of voice and/or data. For example, the communication module may include a connection to a Plain Old Telephone Service (POTS) line, or a Voice-over-Internet Protocol (VOIP) line for voice communication. In addition, the network interface 170 may be configured to couple into an existing network, through wireless protocols (Bluetooth, 802.11a, ac, b, g, n, or the like) or through wired (Ethernet, or the like) connections, or through other more generic network connections. In still other configurations, a cellular link can be provided for both voice and data (i.e., GSM, CDMA or other, utilizing 2G, 3G, and/or 4G data structures and the like). The network interface 170 is not limited to any particular protocol or type of communication. It is, however, preferred that the network interface 170 be configured to transmit data bi-directionally, through at least one mode of communication. The more robust the structure of communication, the more manners in which to avoid a failure or a sabotage with respect to communication, such as to communicate an audio segment(s) in a timely manner.

The social networking platform 1012 comprises a user interface which can configure the remote device 1010 and the other remote devices 1015a, 1015b, 1015c. In many instances, the remote device 1010 and/or the other remote devices 1015a, 1015b, 1015c comprise a keypad and a display that is connected through a wired connection with the central processing unit 120. The remote device 1010 and/or the other remote devices 1015a, 1015b, 1015c can participated in the audio social network disclosed herein, either with limited functionality (e.g., smartwatch, smart speaker, etc.) or full functionality (e.g., smart television, personal computer, etc.). The server computer 1030 syncs the audio segments and/or audio compilations across all available remote devices 1015, either with limited functionality or full functionality, available to a user. Of course, with the different communication protocols associated with the network interface 170, the network interface 170 may comprise a wireless device that communicates with the communication network 1020 through a wireless communication protocol (i.e., Bluetooth, RF, WIFI, etc.). In other embodiments, the social networking platform 1012 may comprise a virtual programming module in the form of software that is on, for example, a smartphone, in communication with the network interface 170. In still other embodiments, such a virtual programming module may be located in the cloud (or web based), with access thereto through any number of different computing devices. Advantageously, with such a configuration, a user may be able to communicate with the social networking system 1000 remotely, with the ability to change functionality.

With reference to FIG. 4, a flowchart 400 is illustrated of a method for creating and uploading an audio segment. In particular, the flowchart 400 can begin with process 410 in which audio is recorded on a device, such as the remote device 1010. Process 410 proceeds to process 420. Process 420 detects audio feature(s) within the audio recorded in process 410, such as with the algorithm discussed above that extracts audio features from the recorded audio and if a criteria is met, the social networking platform 1012 will upload isolated audio segments based on the algorithm. For example, the remote device 1010 can use word recognition to select a portion of the recorded audio that may be of interest to other users and create a segment of audio, that is the audio segment, surrounding a recognized word. Thus, the audio segment includes at least one audio feature, such including a particular word or a particular sound. Process 420 proceeds to process 430.

Process 430 isolates an audio segment triggered by the detected audio feature(s) in process 420. For example, the remote device 1010 can store a predetermined length of audio on either side of the recognized word to isolate audio surrounding the recognized word, such as for example 10 seconds before and 10 seconds after the recognized word, to create the audio segment. Process 430 proceeds to process 440. Process 440 uploads the audio segment isolated in process 430. In an embodiment, the audio segment is uploaded by the server computer 1030. In at least one embodiment, the social networking platform 1012 creates and presents a user with a summary of significant audio segments from a user's day, and in at least one embodiment, in a form of an audio compilation that is created from these audio segments.

With reference to FIG. 5, a flowchart 500 is illustrated of a method of creating and publishing an audio compilation from uploaded user audio segments, for a particular user. In particular, the flowchart 500 can begin with process 510 with which audio segments for a particular user are received. For example, after audio segments are recorded and created, such as in processes 410-430, the server computer 1030 receives the audio segments from a particular user. Process 510 proceeds to process 520. Process 520 detects audio features from the audio segments received in process 510. For example, the remote device 1010 can implement process 520 and use word recognition to select a portion of the recorded audio that may be of interest to other users and create a segment of audio, that is an audio segment, surrounding a recognized word. In at least one embodiment, the social networking platform 1012 can implement sound recognition (e.g., a siren, music, an explosion, laughter, and/or any other desired particular sound that may trigger generation of an audio segment that includes this audio feature, that is this particular sound) as a basis for creating the audio segments that include an audio feature, such as a particular sound as disclosed herein. Process 530 creates and saves an audio compilation from a particular user's audio segments detected in process 520 based on geolocation information, time information, and/or detected audio features, such as keywords. For example, the server computer 1030 creates such an audio complication for a particular user. Process 530 saves an audio compilation created for a particular user. For example, the server computer 1030 saves an audio compilation created for a particular user in the database 1040. In at least one embodiment, this audio compilation can be made available for a limited time, that is the audio compilation stored in database 1040 can be stored for a short period of time, e.g., one hour, a few hours, one day, and thereafter automatically deleted from the database 1040, by the server computer 1030. In an alternate embodiment, the audio compilation is stored indefinitely, or for longer periods of time than the described short period of time. In at least one embodiment, the server computer 1030 further filters the audio segments received in process 510. For example, the server computer 1030 can further filter the audio segments based on word recognition to reduce the number of audio segments within an audio compilation. Process 530 proceeds to process 540.

Process 540 receives a request from a user to publish an audio segment(s) and/or an audio compilation(s). For example, the social networking platform 1012 that created audio segments and communicated the audio segments to the server computer 1030 can send a request to the server computer 1030 to publish and/or unpublish the audio segments and/or audio compilations, which were stored in process 530. In at least one embodiment, the server computer 1030 can stream the audio segments and/or audio compilations, that is either as a whole compilation or as individual audio segment(s) from the audio compilation, to the one or more of the other remote devices 1015a, 1015b, 1015c.

With reference to FIG. 6, a flowchart 600 is illustrated of a method for using geolocation information and/or time to stream audio segments and/or audio compilations. In particular, the flowchart 600 can begin with process 610 with which geolocation information associated with one or more of the other remote devices 1015a, 1015b, 1015c is received. In at least one embodiment, the audio segments communicated to the server computer 1030 include associated geolocation information, that is geolocation information indicating where the remote device was located when recording the audio segments, respectively. For example, when a user of one or more of the other remote devices 1015a, 1015b, 1015c wants to receive and listen to an audio segment(s) and/or an audio compilation(s) uploaded by the remote device 1010, one or more of the other remote devices 1015a, 1015b, 1015c executes a social networking platform 1012 on their device(s), respectively. In response to the execution of the social networking platform 1012, geolocation information is transmitted from the one or more of the other remote devices 1015a, 1015b, 1015c. The server computer 1030 receives this user geolocation information, that is geolocation information associated with the one or more of the other remote devices 1015a, 1015b, 1015c. In at least one embodiment, the server computer 1030 retrieves these audio segments and/or audio compilations based on the received geolocation information, such as based on a proximity between where the audio segment was recorded and the current location of the other remote devices 1015a, 1015b, 1015c. In at least one embodiment, the audio segments and/or audio compilations are ordered based on a time of creation, that is newest to oldest or oldest to newest. Process 510 proceeds to process 520. In at least one embodiment, the audio segments and/or audio compilations are ordered based on both geolocation and time of creation.

Process 520 streams published audio compilations, that is two or more audio segments associated with particular users, respectively, based on geolocation information, time information, and/or any other user and system data. In at least one embodiment, individual audio segments and/or audio compilations are published, uploaded and/or streamed, for others to hear only after a user has reviewed and approved the audio segments and/or audio compilations for publication. For example, the server computer 1030 can formulate audio compilations based on at least one of the geolocation information and time information. The server computer 1030 stores a number of audio segments and/or audio compilations in a storage device, such as in database 1040 (FIG. 1). In response to the server computer 1030 receiving the geolocation information in process 510, indicating a user's desire to receive audio segments and/or audio compilations, the server computer 1030 searches the database 1040 for audio segments and/or audio compilations that are associated with the received geolocation information from process 510. In at least one embodiment, the server computer 1030 filters the searched audio segments and/or audio compilations based on how old they are, that is based on their time of creation relative to a current time. For example, the server computer 1030 can filter the searched audio segments and/or audio compilations for those less than 30 minutes old. Once the search results are returned, the server computer 1030 streams these published audio compilations to the other remote devices 1015a, 1015b, 1015c from which the geolocation information was received from in process 510. In an embodiment, the other remote devices 1015a, 1015b, 1015c can be provided with an ordered list of audio segments and/or audio compilations that are ordered based on at least one of the geolocation information and the time information. In such an embodiment, the server computer 1030 streams these published audio compilations to the other remote devices 1015a, 1015b, 1015c based on user selection from the ordered list. In at least one embodiment, the audio compilations or audio segments are streamed without user control, simply based on geolocation information and/or time of creation information. In at least one embodiment, the server computer 1030 limits streaming of the audio compilation and/or audio segments to a single instance and moves to a next audio compilation or a next audio segment. Process 520 proceeds to process 530.

In at least one embodiment, the flowchart 500 can further include a process 530. Process 530 includes receiving a "lift" request from a user listening to the streamed audio compilations. In at least one embodiment, the lift request indicates that the user listening to a particular audio segment and/or compilation in process 520, from a particular other user, would like to listen to future audio segments and/or audio compilations from that particular user. For example, the particular user can be associated with a unique identifier (ID). In at least one embodiment, the user wanting to listen to further audio segments and/or audio compilations from the desired particular other user can select that particular user's ID with their social networking platform 1012. Process 530 proceeds to process 540. Process 540 adds the "lift" to the particular user owning the streamed audio compilation such that future audio segments and/or audio compilations will be automatically made available to the user submitting the lift request, irrespective of time information and geolocation information associated with such further audio segments and/or audio compilations.

With reference to FIG. 7, a flowchart 700 is illustrated for a method of setting up a call between users based on geolocation information. In at least one embodiment, other user and system provided data can be used to setup a call between users. The method of flowchart 700 can be used in combination with any of flowcharts 400, 500, and 600. In particular, the flowchart 700 can begin with process 710 in which geolocation information for a user is received. For example, the server computer 1030, e.g., the transceiver 170, receives geolocation information from the remote device 1010 and geolocation information from the one or more other remote devices 1015a, 1015b, 1015c. Process 710 proceeds to process 720. Process 720 includes setting up a call or connection (e.g., to be able to exchange other information, such as test, pictures, video, etc., as well as voice) between users based on geolocation information. For example, the server computer 1030, e.g., the transceiver 170, can establish the call or connection, such as a text chat, a voice call, a video call, etc., between the remote device 1010 and the one or more other remote devices 1015a, 1015b, 1015c, such as based on their proximity to each other. If the remote device 1010 and the one or more other remote devices 1015a, 1015b, 1015c are within a distance, either predetermined or based on the environment within which the remote device 1010, such as within a stadium, park, music event, sports event, or any other event that is defined by a boundary, and the one or more other remote devices 1015a, 1015b, 1015c are within, the server computer 1030 establishes the call or connection between users. In at least one embodiment, the server computer 1030 can limit the number of calls or connections between a particular remote device to a given number of calls, such as ten calls or connections, within a time period, such as within a day. In at least one embodiment, the call-in process 720 is anonymous, that is the parties are not given personal information of the other caller, only provided with the unique ID. In at least one embodiment, the server computer 1030 limits the call or connection to a predetermined length of time, and in at least one embodiment a new call or connection is automatically established based on geolocation information. Process 720 proceeds to process 730.

In at least one embodiment, the flowchart 700 can include a process 730. Process 730 includes interrupting a call, e.g., ending a call, such as that setup in process 720, between users based on call duration or based on geolocation information. For example, the server computer 1030 monitors the length of the call established in process 720. The server computer 1030 further monitors real-time geolocation information for the remote device 1010 and the one or more other remote devices 1015a, 1015b, 1015c for which the call was established in process 720. If a call longer than a time threshold or the geographic distance between remote devices is greater than a distance threshold, the server computer 1030 interrupts the call established in process 730.

Although the remote device 1010 is described herein as creating audio segments, one skilled in the art would recognize that other devices within the social networking system 1000 can create such audio segments, without departing from the scope of the embodiments. For example, the remote device 1010 can send non-segmented audio to the server computer 1030. In such an embodiment, the server computer 1030 includes functionality disclosed herein for the social networking platform 1012 to create the audio segments. Such a configuration can be implemented for devices with limited processing power, such as for smart speakers, to offload the creation of the audio segments described herein.

Figure 8:
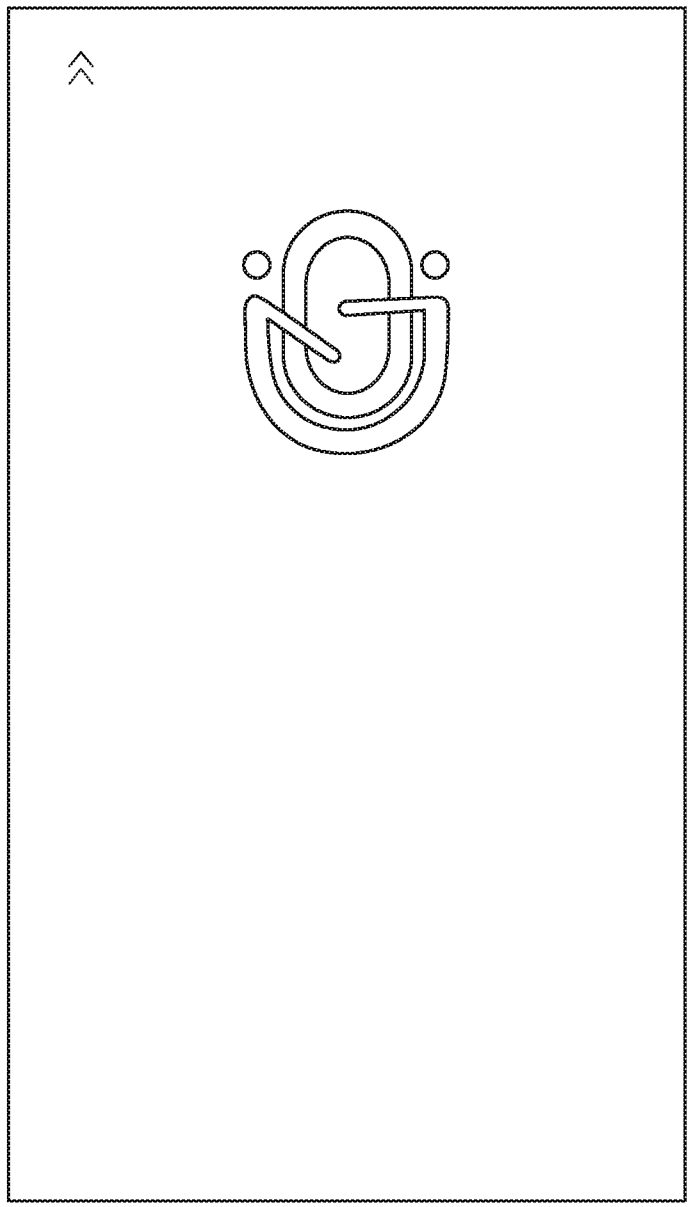

FIGS. 8-22 illustrate various graphic user interfaces (GUIs) 800-2200 of the social networking platform 1012 shown in FIG. 1. In particular, FIG. 8 illustrates a GUI 800 showing a splash screen that is shown when the social networking platform 1012 starts. For example, a user will see the splash screen shown with a logo and, in some embodiments, can further include a short animation. After the short animation, if the user is not signed up, they are moved to a SIGN-UP page (shown in GUI 900 illustrated in FIG. 9) or if they are signed up, the user is moved to the MAIN page (shown in GUI 1100 illustrated in FIG. 11).

Figure 9:
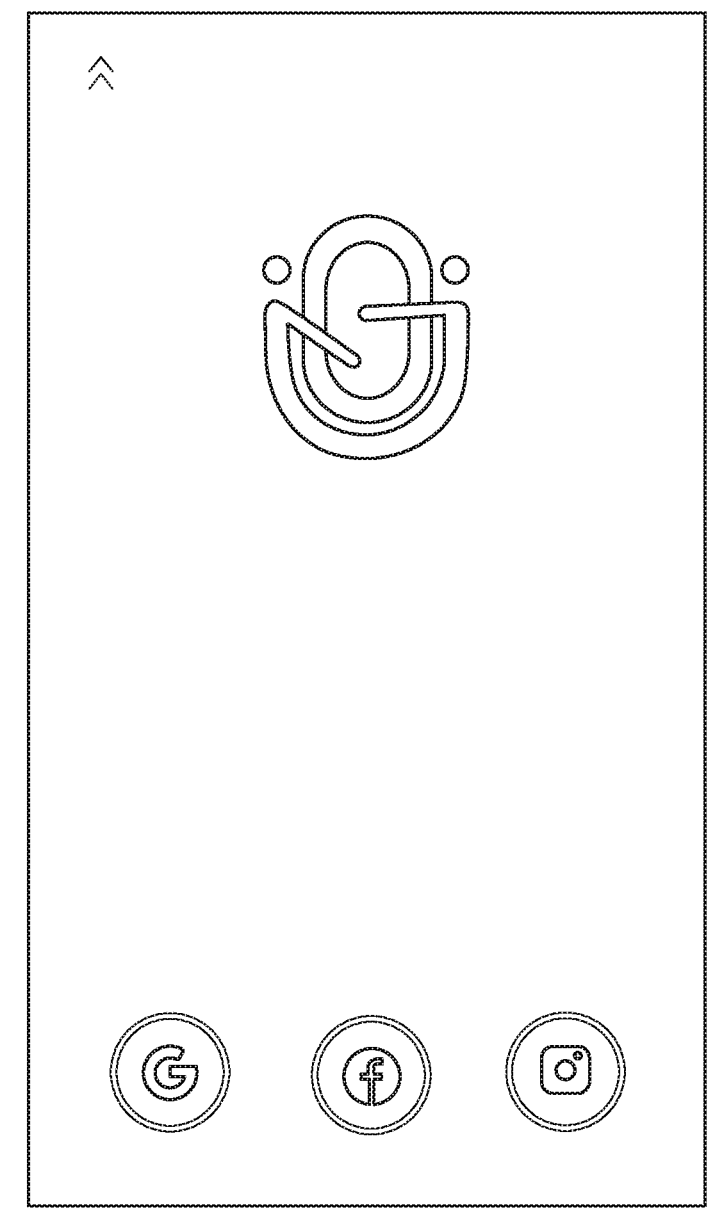

FIG. 9 illustrates the GUI 900 showing a SIGN-UP page in which a user chooses one of selected providers and signs up. If the user is signing up for the first time, the user is redirected to the TUTORIAL page (illustrated in GUI 700 shown in FIG. 7), or if the user already listened to the tutorial, the user is redirected to the MAIN page (illustrated in GUI 1100 shown in FIG. 11).

Figure 10:
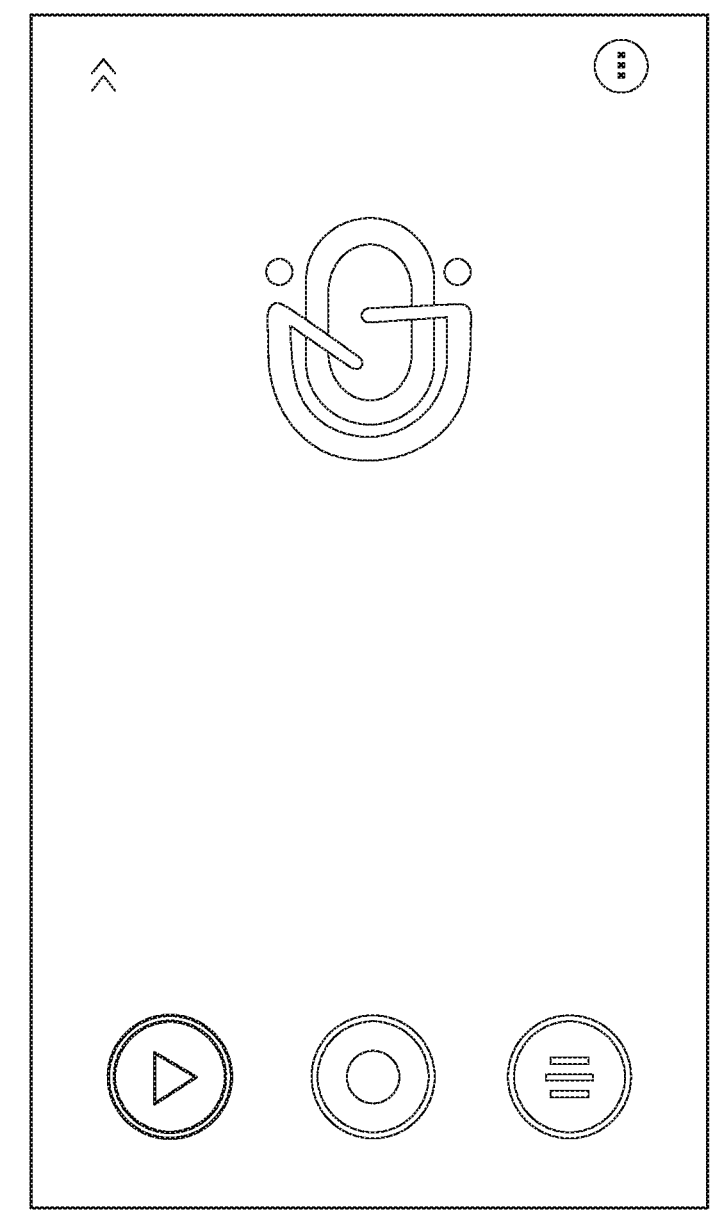
Figure 11:
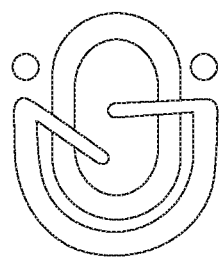

FIG. 10 illustrates the GUI 1050 showing an option for the user to press a PLAY button when signing up for the first time, which starts the tutorial after which the user is redirected to a MAIN page (illustrated in GUI 1100 shown in FIG. 11). Also shown is an option for the user to press the SETTINGS button, which redirects the user to the SETTINGS page (illustrated in GUI 1700 shown in FIG. 17).

Figure 17:
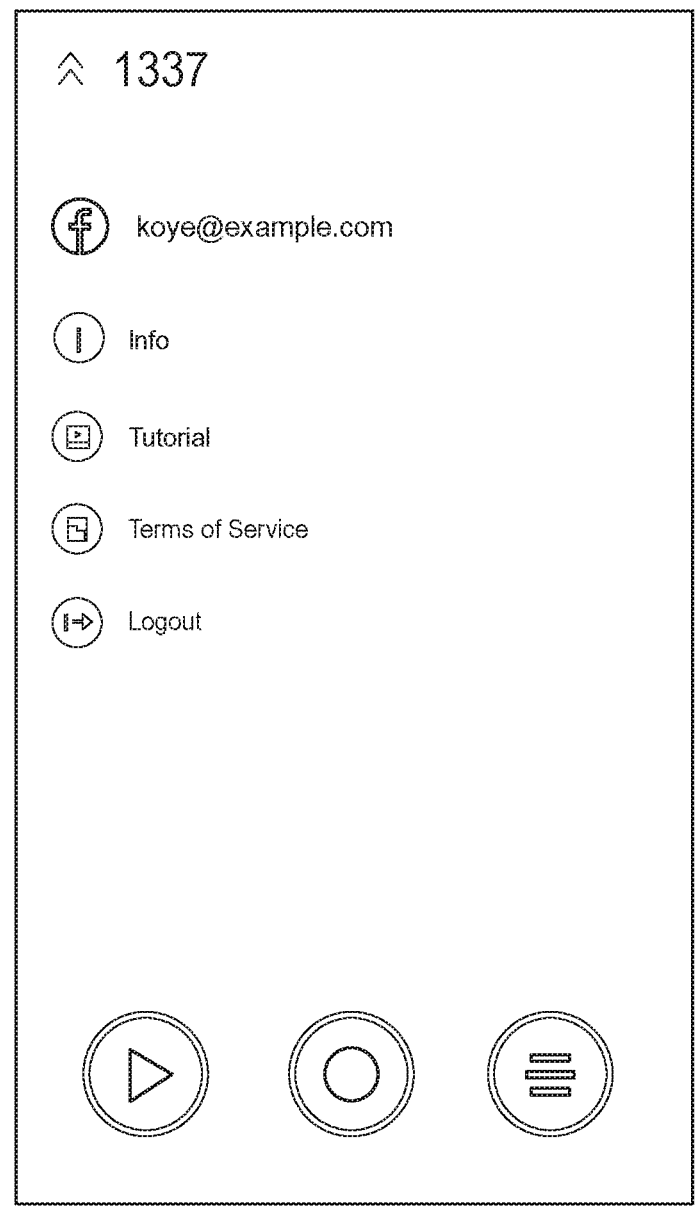
Figure 18:
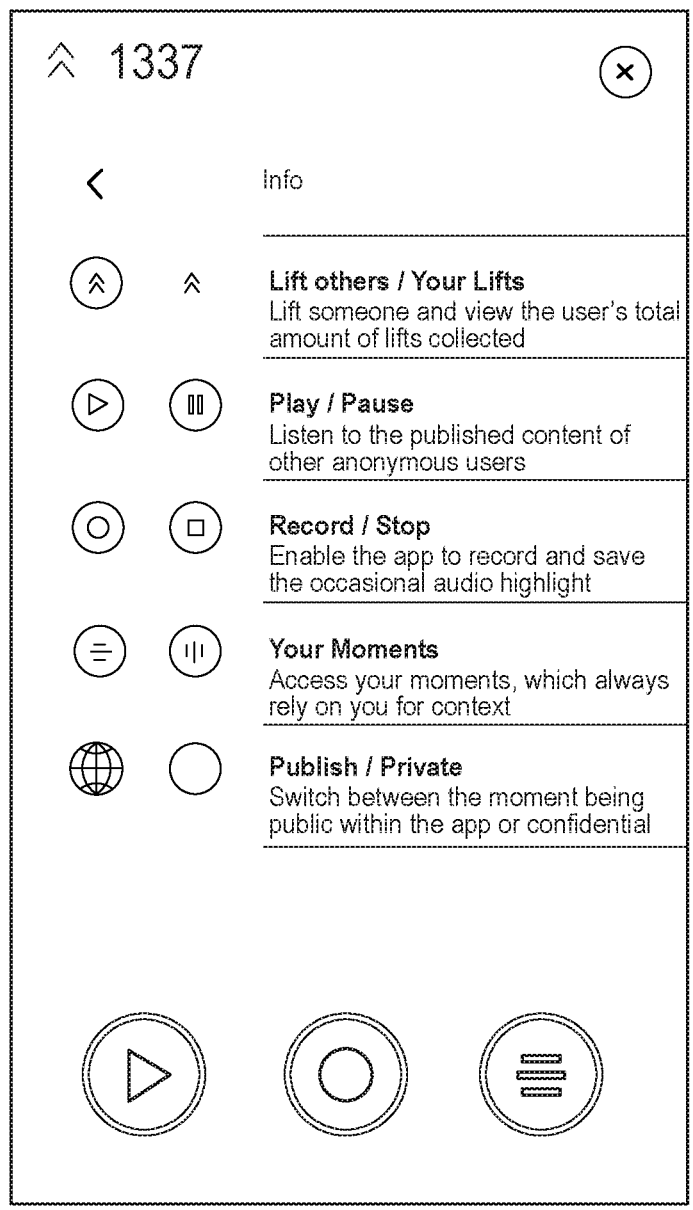

FIG. 11 illustrates the GUI 1100 showing the MAIN page in which the user is presented with an option to press the PLAY button which redirects the user to the STREAM screen (illustrated in GUI 1300 shown in FIG. 13), a RECORD button which activates audio record functionality (illustrated in GUI 1200 shown in FIG. 12), the MOMENTS button which redirects the user to MOMENTS screen (illustrated in GUI 1400 shown in FIG. 14), and the SETTINGS button which redirects the user to the SETTINGS screen (illustrated in the GUI 1700 shown in FIG. 17). In the top left corner of the GUI a user is shown the total number of LIFTs the user has received. When the user publishes his MOMENT (illustrated in the GUI 1400 shown in FIG. 14) that MOMENT can be heard on the STREAM page (illustrated in the GUI 1300 shown in FIG. 13) and other users can press the LIFT button on their remote device to add a LIFT to the total LIFTs of the user owning that MOMENT.

Figure 12:
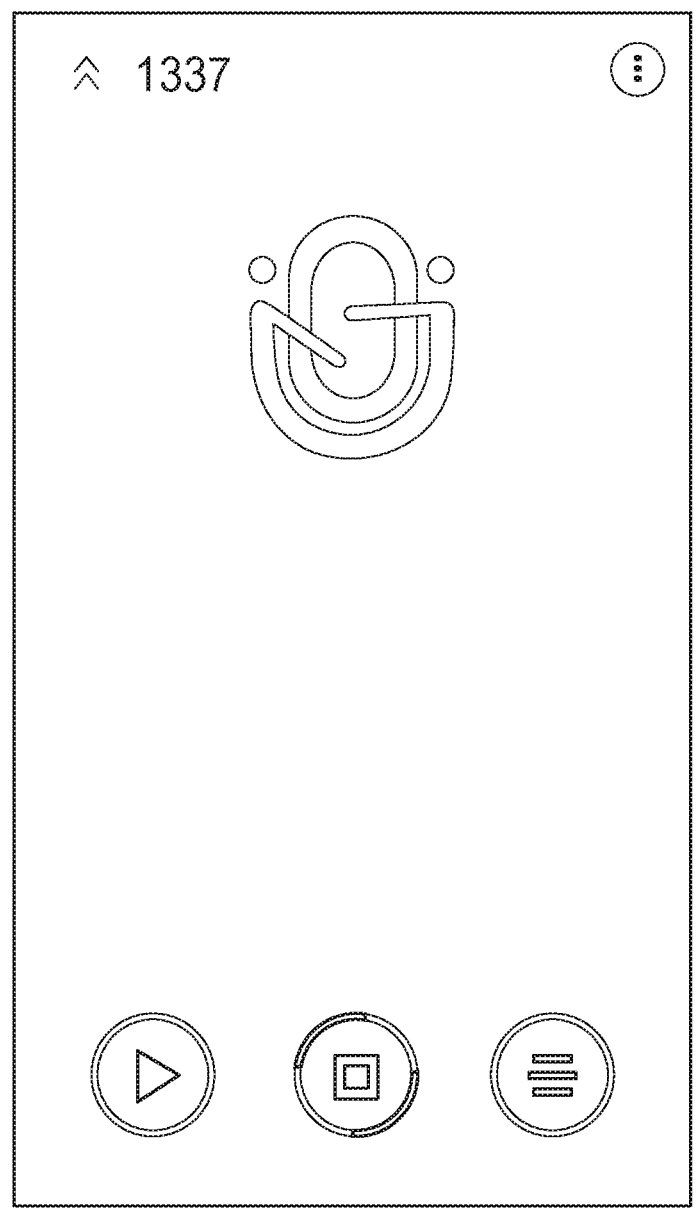

FIG. 12 illustrates the GUI 1200 showing an option for the user to press the RECORD button, at which time the social networking platform 1012 will start recording audio on their remote device. In at least one embodiment, the social networking platform 1012 will also record audio if the RECORD button was pressed and the social networking platform 1012 was moved into the background, called background recording. For example, pressing the RECORD button can initiate execution of the method shown in flowchart 400. When the segment is isolated and uploaded, the social networking platform 1012 again extracts the audio features and filters the received audio segment and stores them. When enough audio segments were uploaded by the social networking platform 1012 from the user, the social networking platform 1012 executes an algorithm to create an audio compilation, the "MOMENT", from the uploaded audio segments. In at least one embodiment, not all uploaded audio segments will end up in the compilation. For example, the server computer 1030 curates which audio segments will create the MOMENT mix and, in an example, the user cannot alter it. At this instance, the method of flowchart 600 can be executed. In at least one embodiment, process 640 and process 650 are processed by the user on a MOMENTS page (illustrated in GUI 1500 shown in FIG. 15).

Figure 13:
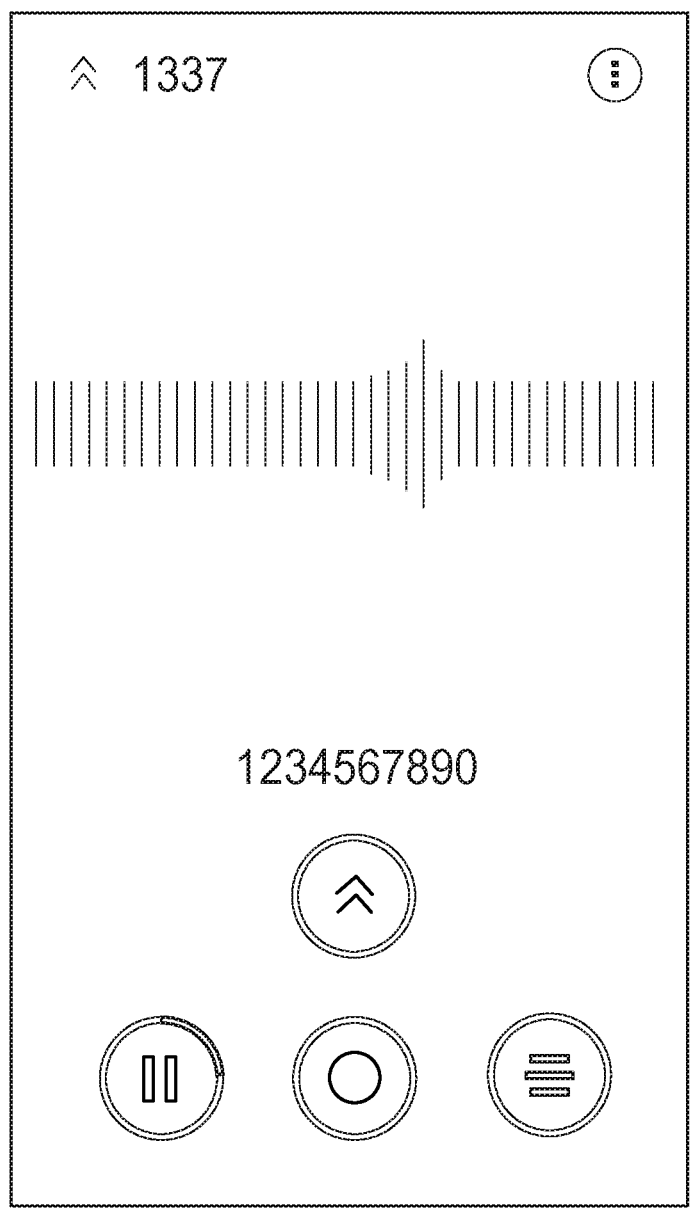

FIG. 13 illustrates the GUI 1300 showing a STREAM page which is based on the user's geolocation and time. For example, the user will receive published audio segments and/or audio compilations and play them one by one, published MOMENTS from other users. In at least one embodiment, the user can only see the TOTAL number of LIFTs from the user of who's MOMENT is currently being listened to and is given an option to press the LIFT button to add a LIFT to that same user's total. The user can PAUSE streamed MOMENTS and resume them by pressing PLAY again. In at least one embodiment, the server computer 1030 curates an order in which the MOMENTS are streamed. At this instance, the method of flowchart 500 can be executed.

Figure 14:
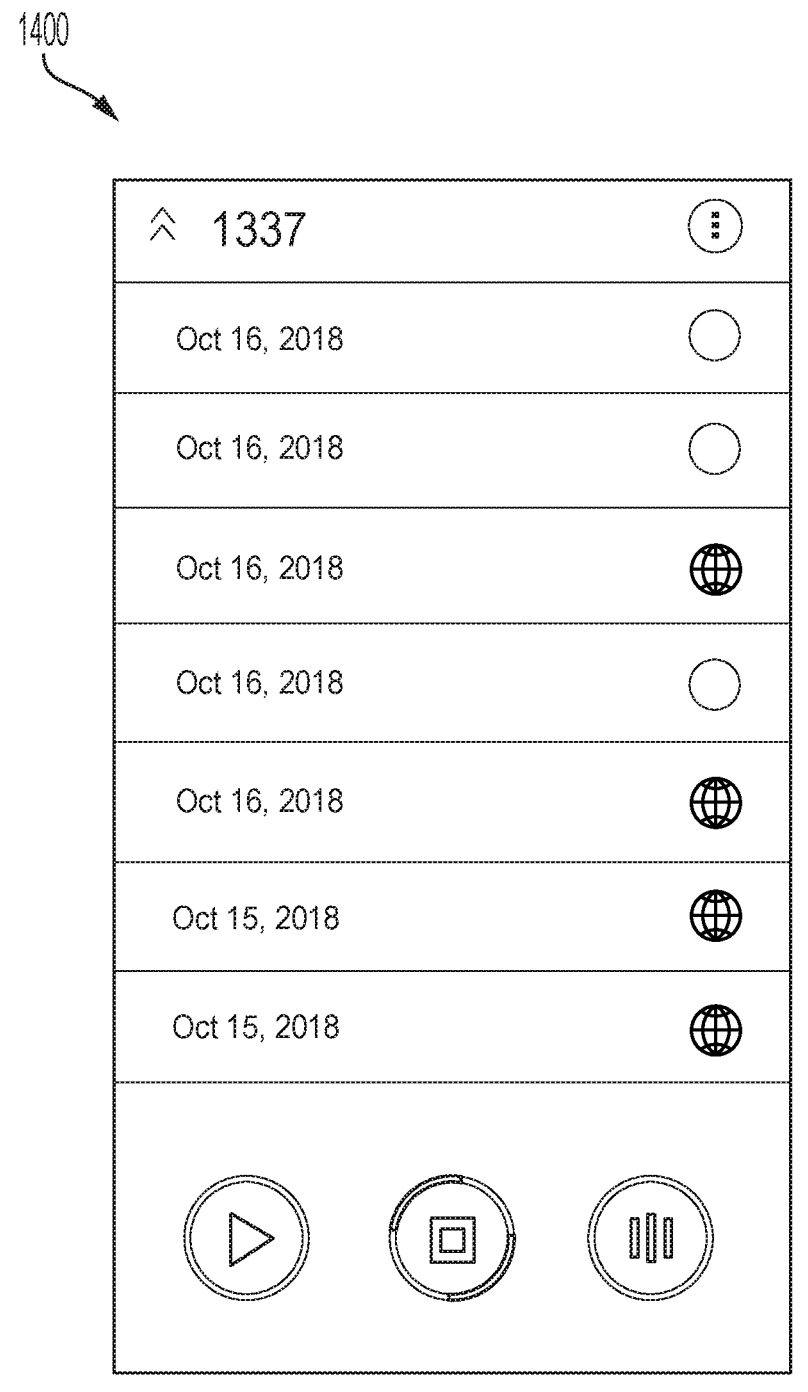

FIG. 14 illustrates the GUI 1400 showing an option with which the user can see a list of all of their MOMENTS, referenced above as audio compilations. For example, the MOMENTS are represented by the date and the time of creation of that particular MOMENT, although other representations are within the scope of the embodiments disclosed herein. The user can listen to one of their MOMENTS by pressing it and by pressing it again to stop it. In at least one embodiment, the user cannot edit any of their MOMENTS, only provided an option to publish, delete (illustrated in the GUI 1500 shown in FIG. 15) or share on another provider, such as Facebook, Instagram, Google, etc., but other options are within the scope of the embodiments disclosed herein. The MOMENT can be private which is shown as an empty circle, or public which is shown as a globe. For example, publishing, such as that performed by process 540, is executed by pressing the empty circle next to the shown date/time. Such an action results in the circle changing into the globe, meaning that other users listening to the stream can hear this published MOMENT (illustrated in GUI 1300 shown in FIG. 13). In an example, such an action can have a delay. If the MOMENT is public, shown as the globe, the user is presented with the option to press the globe, which results in the MOMENT becoming private again, shown as the empty circle. Such an action removes the MOMENT from the stream. In an example, such an action can have a delayed removal of the MOMENT from the stream, such as within minutes, hours, days, etc.

Figure 15:
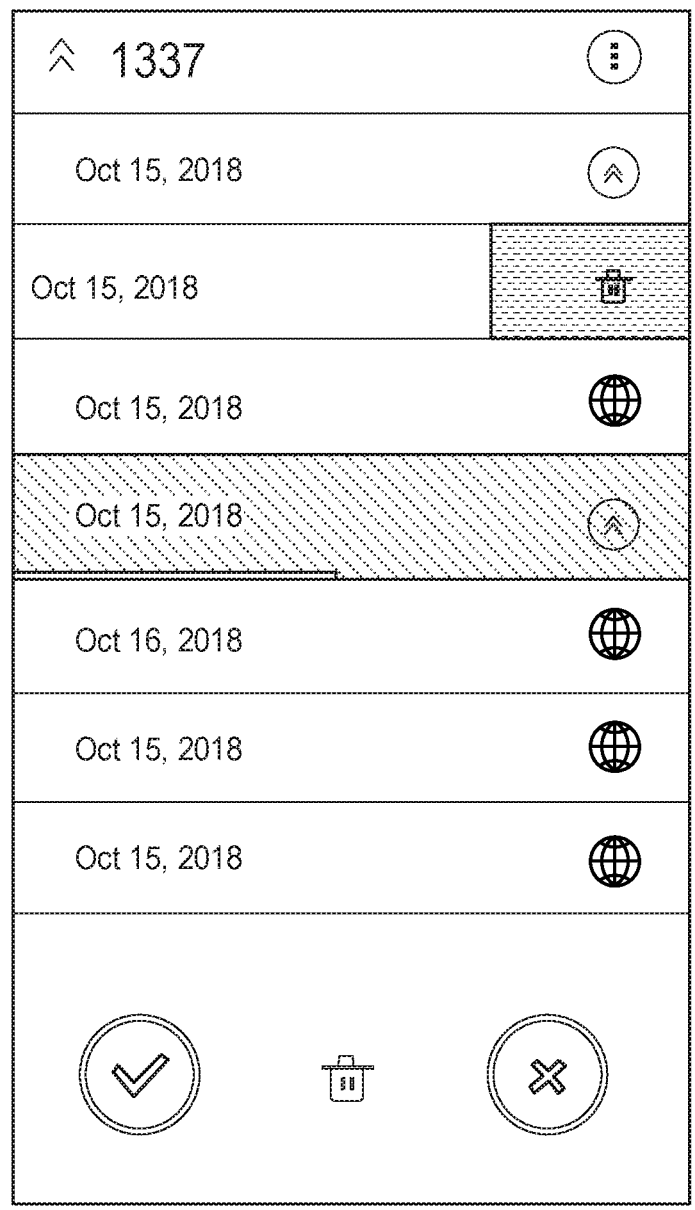

FIG. 15 illustrates the GUI 1500 showing an option for the user to swipe his MOMENT to the left, which exposes the DELETE button. By pressing the DELETE button, and confirming in the dialog appearing on the bottom slider, the user will delete that MOMENT which also removes that MOMENT from the stream if the MOMENT was public. In an example, such an action can have a delayed deletion from the server computer 1030, such as within minutes, hours, days, etc. In at least one embodiment, if the DELETE bottom is pressed a dialog for confirmation appears to confirm deletion.

Figure 16:
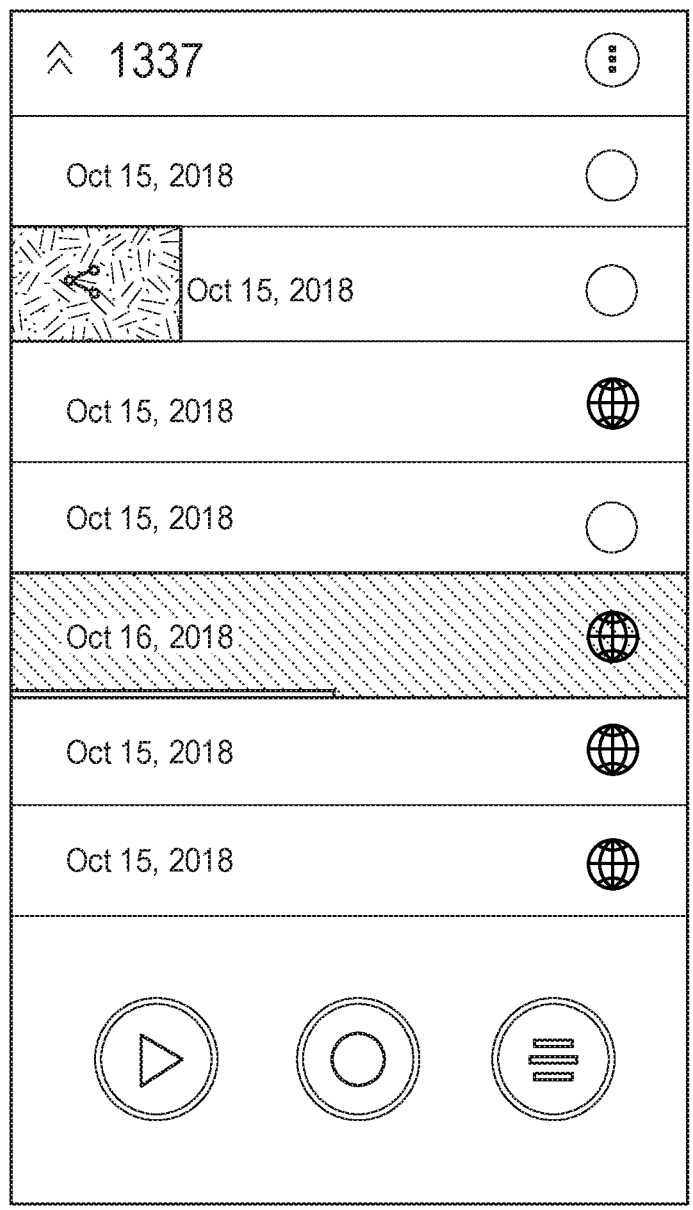

FIG. 16 illustrates the GUI 1600 showing an option for the user to swipe his MOMENT to the right, which exposes the SHARE button. By pressing the SHARE button, the user can choose providers that are installed on his remote device and share that MOMENT on the chosen provider. In an example, such an action can have a delayed share, such as within minutes, hours, days, etc. In at least one embodiment, if the SHARE bottom is pressed an option appears for further sharing of that same MOMENT.

FIG. 17 illustrates the GUI 1700 in which the user can see the provider and the email that he used to sign up for the audio segmenting and audio compilation features described herein. The user is also presented with an option to press an INFO button (illustrated in GUI 1800 shown in FIG. 18 on a SETTING page), press a TUTORIAL button to listen to the tutorial again (illustrated in the GUI 1050 shown in FIG. 10), to see the terms of service and privacy policy (currently both are on the same link) press the TERMS OF SERVICE button, and LOGOUT for the equivalent action. In at least one embodiment, the settings are accessible to the user at all times.

Figure 19:
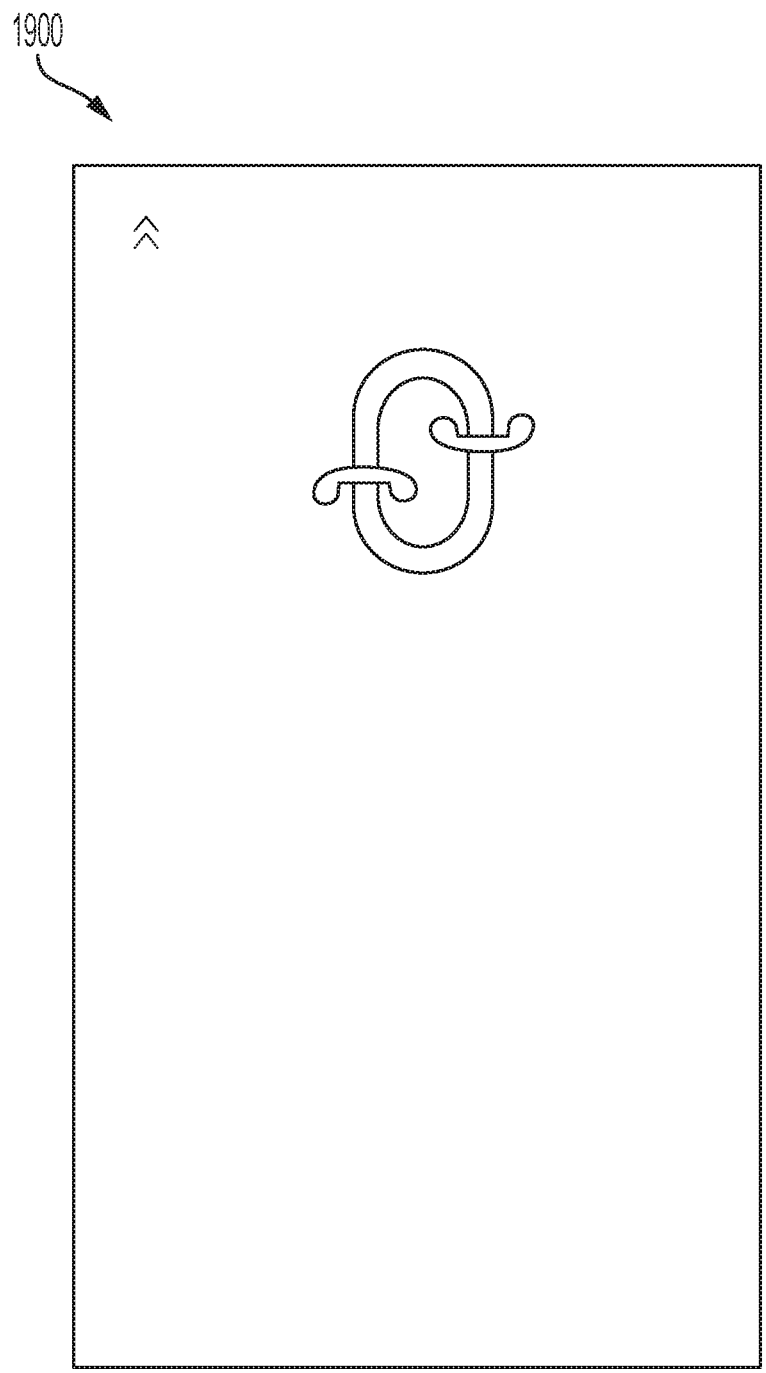

FIG. 19 illustrates a GUI 1900 which shows a splash screen that is displayed for a user when the social networking platform 1012 starts for a user to make a call. In at least one embodiment, the user is also presented with a short animation in additional to the GUI 1900. After the GUI 1900 is displayed, the user is redirected to the MAIN page (FIG. 20).

Figure 20:
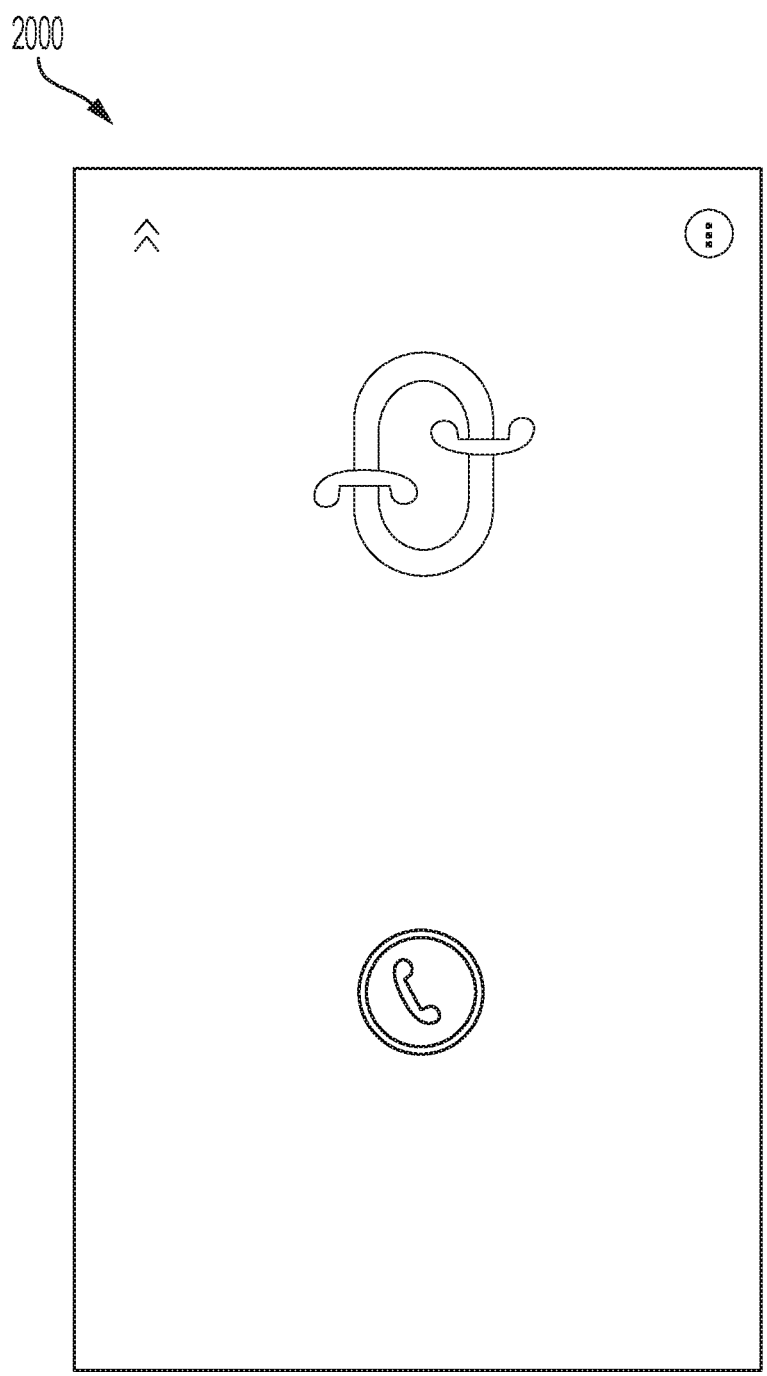

FIG. 20 illustrates a GUI 2000 which provides the user with an option to press the CALL button, which signals the server computer 1030 to find nearby remote devices and setup an anonymous, such as an audio only, call therebetween, such as that performed by process 700. The call duration is curated by the server computer 1030. The server computer 1030 can interrupt a call between users and redirect them to other nearby users. In at least one embodiment the server computer 1030 splits a geographic map into regions, e.g., a dozen regions, and depending on the region of the caller, the users are matched, that is giving priority to a first region that is closest surrounding the user. If another user that is nearer starts a call, that is nearer than the user with whom the user is currently having a conversation, the social networking platform 1012 interrupts that current call and redirects the call to the user who is nearer. In at least one embodiment, GUI 2000 includes an animation in which two phones are shown as being connected together to conduct a call.

Figure 21:
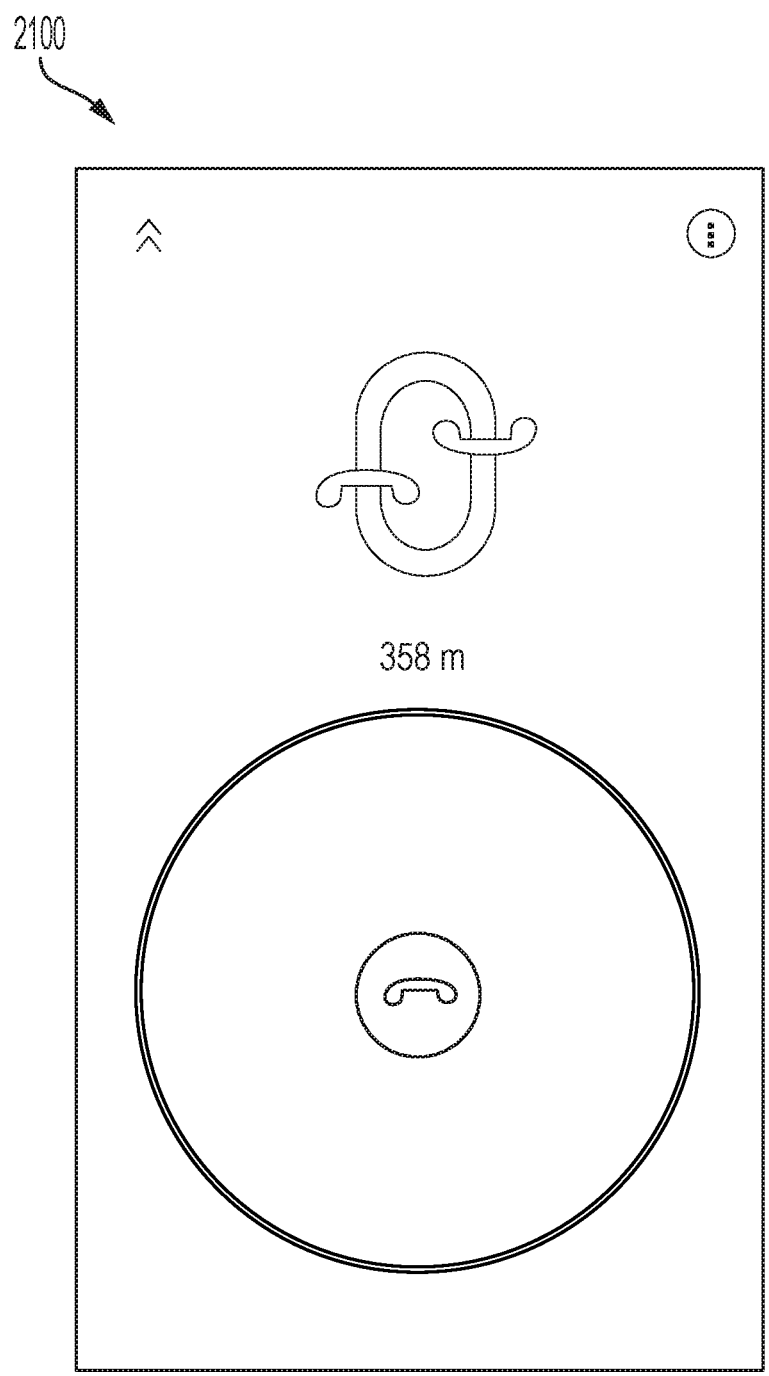

FIG. 21 illustrates a GUI 2100 which, when a call between users is established, creates a large circle around the END call button, as shown. The circle will narrow as the conversation is ongoing, and by the time it merges with END call button the social networking platform 1012 will redirect the user to another call if there is a nearby user requesting a call. In another embodiment, a user is provided with an option to continue a currently active call.

Figure 22:
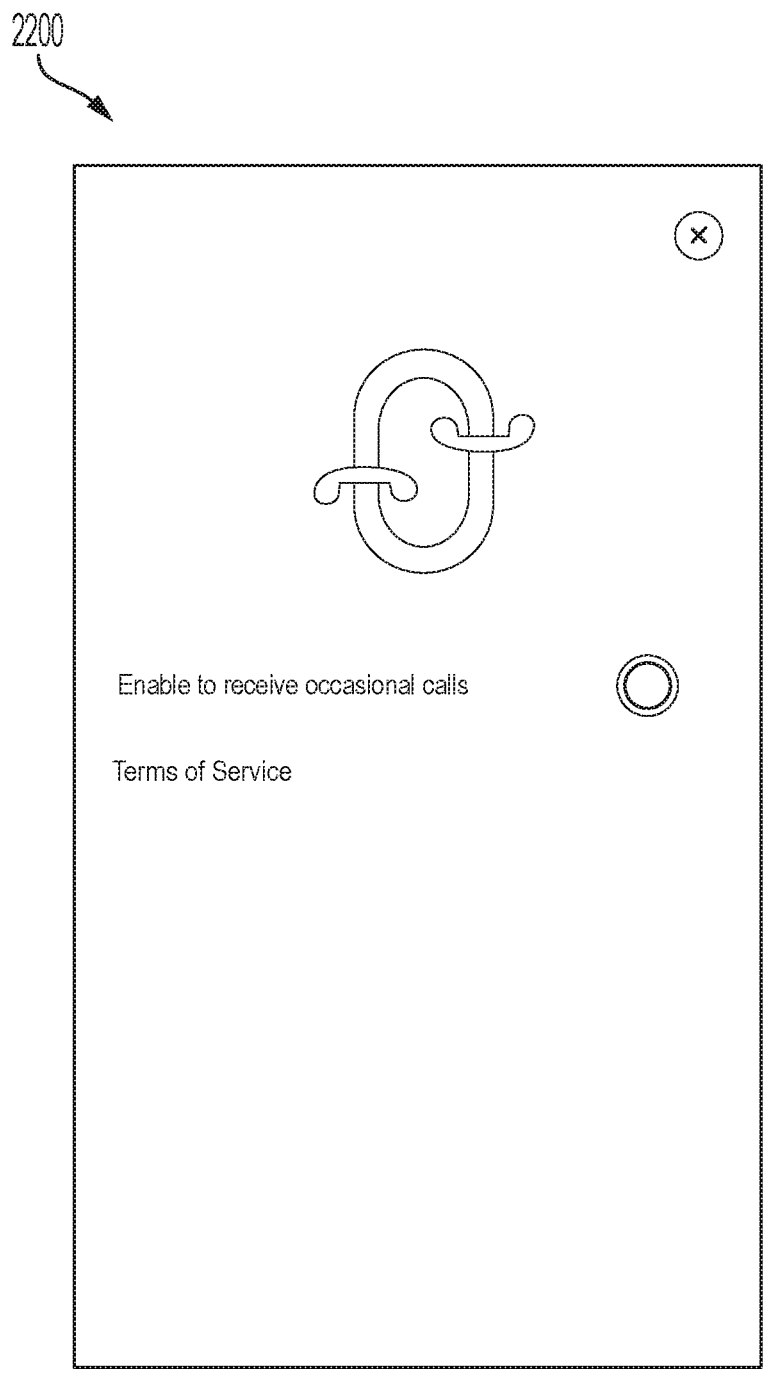

FIG. 22 illustrates a GUI 2200 which provides the user with the option to enable reception of occasional calls from other users that click their call button, respectively. In at least one embodiment, an occasional call is permitted once on an hourly basis and with proprietary filters, such as is the user within the sleep cycle and have they recently been active on the social networking platform 1012. The user can also, within the SETTINGS page, view the terms of service and privacy policy by clicking provided text buttons.

FIG. 23 illustrates a flowchart of a method 2300 of communicating an audio segment, in accordance with at least one embodiment disclosed herein. The method 2300, including any of the processes 2310-2320, can further include any of the processes described above performed by any of the components within the social networking system 1000, such as the remote device 1010, one or more of the other remote devices 1015a, 1015b, 1015c, the server computer 1030, etc. The method 2300 can begin with process 2310 that includes receiving, by a transceiver such as by the transceiver 1070, an audio segment from a remote device, such as the remote device 1010. The audio segment includes at least one audio feature extracted from audio recorded by the remote device. Process 2310 proceeds to process 2320.

Process 2320 includes storing, by a storage device such as the database 1040 and/or the hard disk drive 141, the audio segment from process 2310. Process 2320 proceeds to process 2330. Process 2330 includes receiving, such as by the transceiver 1070, a request to communicate the audio segment received in process 2310 to another remove device, such as one or more of the other remote devices 1015a, 1015b, 1015c. Process 2330 proceeds to process 2340.

Process 2340 includes retrieving, by a processor such as the queue processor and/or the CPU 120, the audio segment from the storage device, such as database 1040 and/or the hard disk drive 141, in response to the request to communicate the audio segment to the another remove device in process 2330. Process 2340 proceed to process 2350.

Process 2350 includes communicating, such as by the transceiver 1070, the audio segment to the another remote device, such as one or more of the other remote devices 1015a, 1015b, 1015c, in response to the request in process 2330 to communicate the audio segment to the another remote device.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A method, comprising:
 receiving, by a transceiver and from a first remote device, a plurality of automatically extracted audio segments created by the first remote device, the plurality of automatically extracted audio segments including at least one audio feature and being automatically extracted from audio background recorded by the first remote device;
 storing, by a storage device, the plurality of automatically extracted audio segments;
 formulating, from the audio background recorded by the first remote device, an audio summary compilation including the at least one audio feature;
 receiving, by the transceiver, a request to communicate the audio summary compilation to a second remote device;
 retrieving, by a processor, the audio summary compilation from the storage device in response to the request to communicate the audio summary compilation to the second remove device; and
 communicating, by the transceiver, the audio summary compilation to the second remote device in response to the request to communicate the audio summary compilation to the second remote device.

2. The method according to claim 1, wherein a server computer formulates the audio summary compilation.

3. The method according to claim 1, wherein the first remote device formulates the audio summary compilation.

4. The method according to claim 1, wherein the at least one audio feature is automatically extracted from the audio recorded by the first remote device based on at least one of word recognition and sound recognition, the plurality of automatically extracted audio segments including audio surrounding at least one of a recognized word and a recognized sound based on at least one of the word recognition and the sound recognition, respectively.

5. The method according to claim 1, wherein the plurality of automatically extracted audio segments includes associated geolocation information indicating where the first remote device was located when recording the plurality of automatically extracted audio segments, the method further comprising:
 receiving location information associated with the second remote device; and
 retrieving the plurality of automatically extracted audio segments based on the location information associated with the plurality of automatically extracted audio segments and the location information associated with the second remote device.

6. The method according to claim 1, further comprising:
 filtering the plurality of automatically extracted audio segments based on a time of creation of the plurality of automatically extracted audio segments; and
 communicating the filtered plurality of the automatically extracted audio segments to the second remote device.

7. The method according to claim 1, wherein the communicating comprises at least one of streaming the plurality of automatically extracted audio segments to the second remote device and uploading the plurality of automatically extracted audio segments to the second remote device.

8. The method according to claim 1, wherein the first remote device and the second remote device are at least one of a smart phone, a smart speaker, a portable gaming device, a tablet computer, a personal computer, and a smartwatch.

9. A server computer implementing the method according to claim 1.

10. The method according to claim 1, further comprising:
 receiving geographic information from the first remote device and the second remote device; and
 establishing at least one of a call and connection between the first remote device and the second remote device based on the received geographic information.

11. A device, comprising:
 a transceiver to receive a plurality of automatically extracted audio segments created by a first remote device, receive a request to communicate an audio summary compilation to a second remote device, and communicate the audio summary compilation to the second remote device in response to the request to communicate the audio summary compilation to the second remote device, the plurality of automatically extracted audio segments including at least one audio feature and being automatically extracted from audio background recorded by the first remote device;
 a storage device to store the plurality of automatically extracted audio segments; and
 a processor to formulate, from the audio background recorded by the first remote device, the audio summary compilation including the at least one audio feature and to retrieve the audio summary compilation from the storage device in response to the request to communicate the audio summary compilation to the second remote device.

12. The device according to claim 11, wherein the device is a server computer.

13. The device according to claim 11, wherein the processor further to automatically extract at least one audio feature from the audio recorded by the device based on at least one of word recognition and sound recognition, the plurality of automatically extracted audio segments including audio surrounding at least one of a recognized word and a recognized sound based on at least one of the word recognition and the sound recognition, respectively.

14. The device according to claim 11, wherein the plurality of automatically extracted audio segments includes associated geolocation information indicating where the first remote device was located when recording the plurality of automatically extracted audio segments, wherein:

the transceiver further to receive location information associated with the second remote device; and the processor further to retrieve the plurality of automatically extracted audio segments based on the location information associated with the plurality of automatically extracted audio segments and the location information associated with the second remote device.

15. The device according to claim 11, wherein:

the processor further to filter the plurality of automatically extracted audio segments based on a time of creation of the plurality of automatically extracted audio segments; and the transceiver further to communicate the filtered plurality of the automatically extracted audio segments to the another second remote device.

16. The device according to claim 11, wherein the transceiver at least one of streams the plurality of automatically extracted audio segments to the second remote device and uploads the plurality of automatically extracted audio segments to the second remote device.

17. The device according to claim 11, wherein the first remote device and the second remote device are at least one of a smart phone, a smart speaker, a portable gaming device, a tablet computer, a personal computer, and a smartwatch.

18. The device according to claim 11, wherein the device is a server computer.

19. The device according to claim 11, wherein the transceiver further receives geographic information from the first remote device and the second remote device, and establishes at least one of a call and connection between the first remote device and the second remote device based on the received geographic information.

* * * * *